United States Patent [19]

Hettrick

[11] Patent Number: 4,798,446

[45] Date of Patent: Jan. 17, 1989

[54] APLANATIC AND QUASI-APLANATIC DIFFRACTION GRATINGS

[75] Inventor: Michael C. Hettrick, Berkeley, Calif.

[73] Assignee: The United States of America as represented by the United States Department of Energy, Washington, D.C.

[21] Appl. No.: 95,715

[22] Filed: Sep. 14, 1987

[51] Int. Cl.⁴ .............................................. G01B 5/18
[52] U.S. Cl. ........................... 350/162.23; 350/162.24
[58] Field of Search ........................ 350/162.21–162.24

[56] References Cited

U.S. PATENT DOCUMENTS

| | | | |
|---|---|---|---|
| 3,259,014 | 7/1966 | Johnson et al. | 88/61 |
| 4,012,843 | 3/1977 | Harada et al. | 33/19 A |
| 4,192,994 | 3/1980 | Kastner | 350/162.21 |
| 4,312,569 | 1/1982 | Harada et al. | 350/162 R |
| 4,492,442 | 1/1985 | Gaudyn | 353/10 |

OTHER PUBLICATIONS

Hettrick, Proceedings of the Society of Photooptical Inst. Eng., vol. 560, pp. 96–108 (1985).
Kita et al., Appied Optics, vol. 22, No. 6, pp. 512 to 513 (1983).
Harada et al., Applied Optics, vol. 19, No. 23, pp. 3987 to 3993 (1980).
Kita et al., Applied Optics, vol. 22, No. 4, pp. 819 to 825 (1983).
Murty, Journal of the Optical Society of America, vol. 50, p. 923 (1960).
Kirkpatrick et al., Journal of the Optical Society of America, vol. 38, pp. 766 to 775 (1948).
Rowland, Philosophical Magazine, vol. 16, pp. 197 to 210 (1883).

*Primary Examiner*—Bruce Y. Arnold
*Attorney, Agent, or Firm*—L. E. Carnahan; Roger S. Gaither; Judson R. Hightower

[57] ABSTRACT

A reflection diffraction grating having a series of transverse minute grooves of progressively varying spacing along a concave surface enables use of such gratings for X-ray or longer wavelength imaging of objects. The variable groove spacing establishes aplanatism or substantially uniform magnification across the optical aperture. The grating may be used, for example, in X-ray microscopes or telescopes of the imaging type and in X-ray microprobes. Increased spatial resolution and field of view may be realized in X-ray imaging.

10 Claims, 3 Drawing Sheets

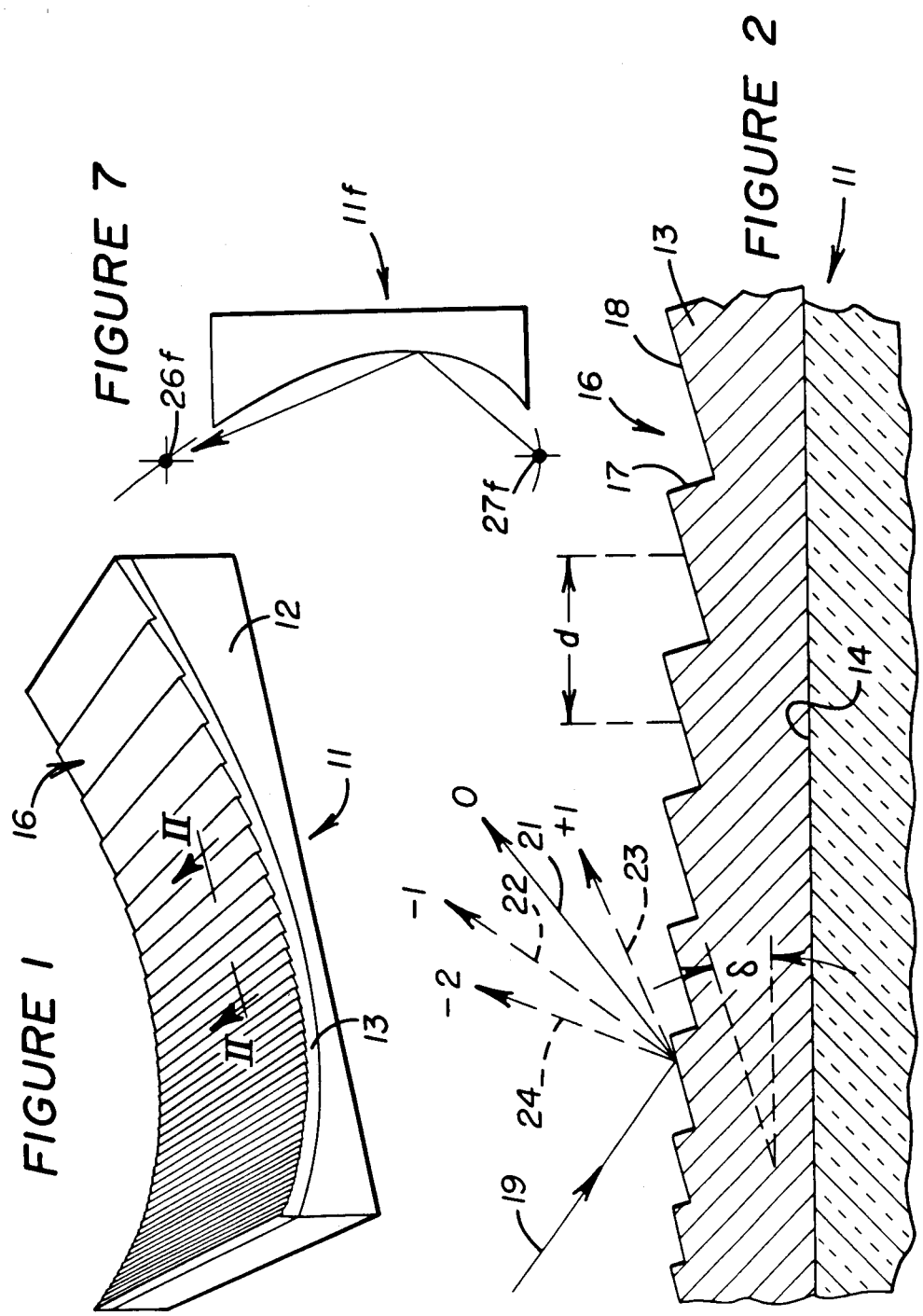

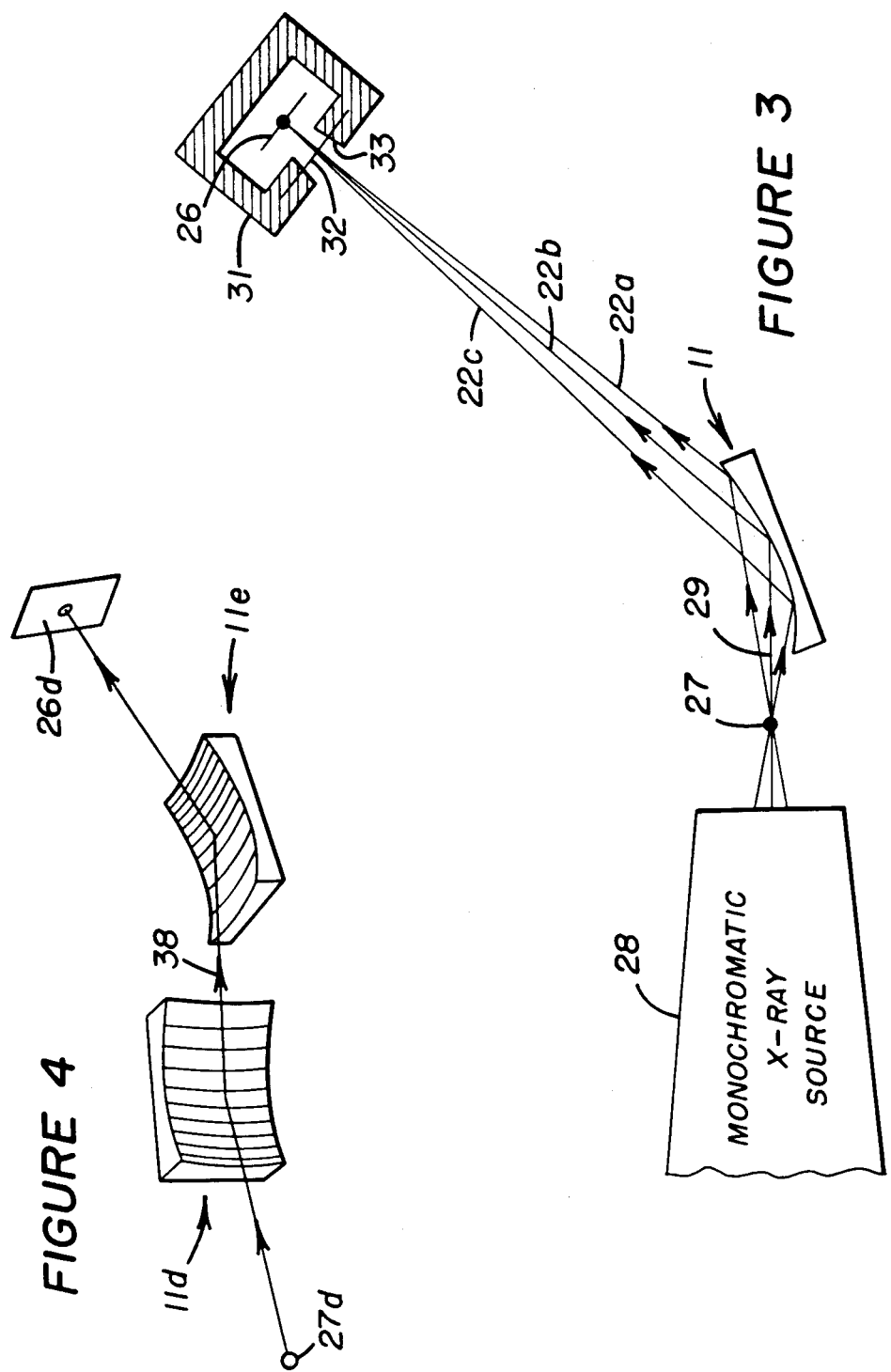

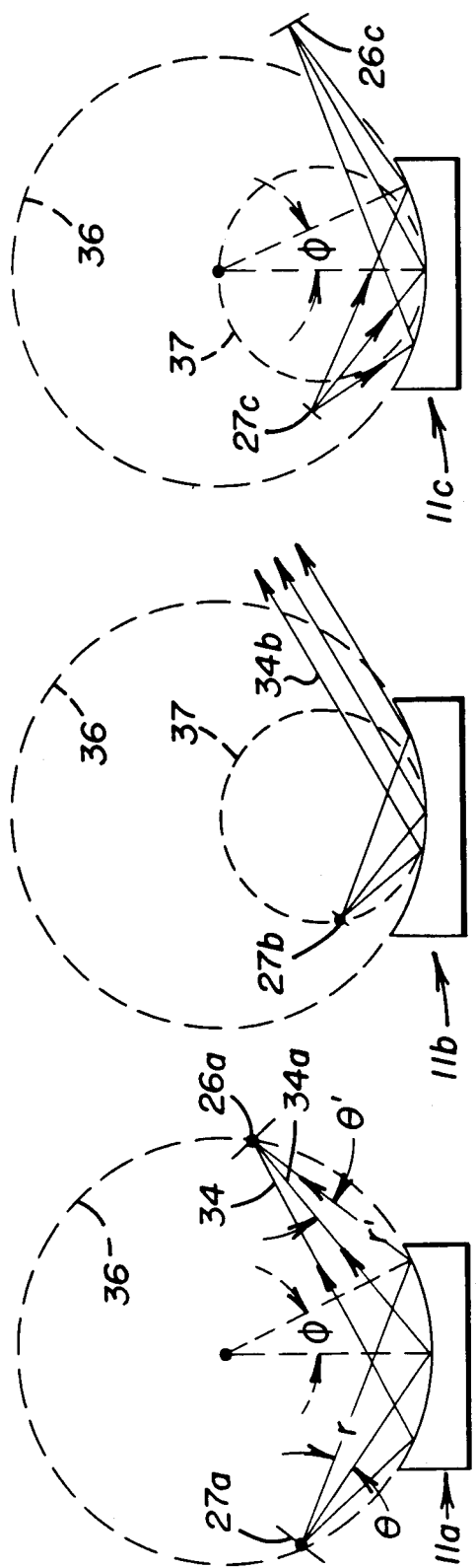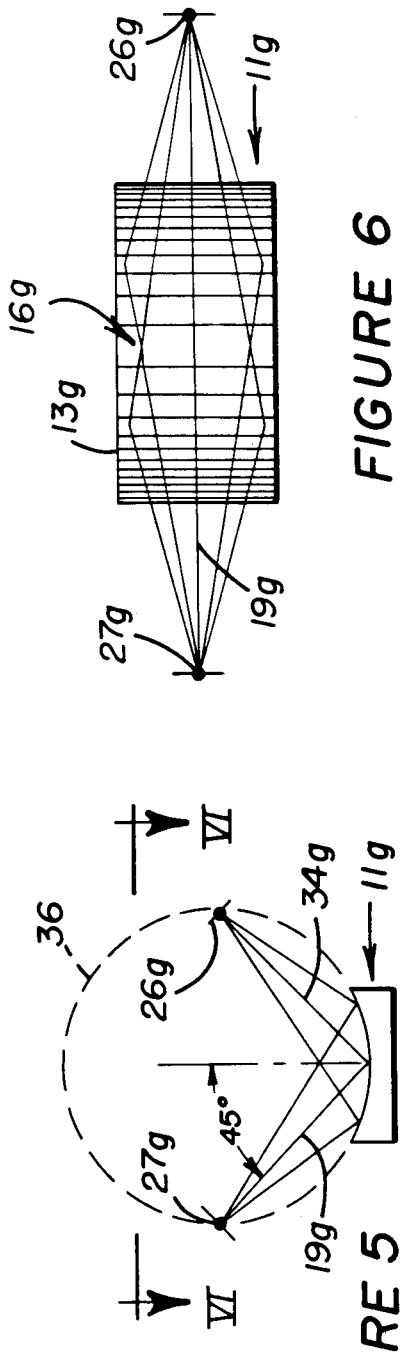

APLANATIC AND QUASI-APLANATIC DIFFRACTION GRATINGS

BACKGROUND OF THE INVENTION

The Government has rights in this invention pursuant to Contract No. DE-AC03-76SF00098 awarded by the U.S. Department of Energy.

This invention relates to optics and more particularly to diffraction gratings for producing images of objects. Primarily, but not exclusively, the invention relates to imaging using soft x-rays.

X-ray imaging of objects provides results that are not obtainable with visible light optical systems. Higher resolution can be realized owing to the shorter wavelengths of x-rays. Soft x-ray imaging has been used, for example, to produce images of living cells in biological tissue at a resolution of 0.05 microns. The penetrative quality of x-rays also enables imaging of the interior regions of objects that are opaque to visible light. X-ray imaging has also been used to analyze laser produced electrical plasmas, in microlithography and to examine the microstructure of materials. X-ray telescopy provides astronomical data that is not obtainable from visible light images.

Glass lenses of the type used to form visible light images do not refract x-rays to an extent sufficient to enable imaging. Prior x-ray imaging systems have in many cases relied on transmission zone plates which have circular grooves defining a series of concentric diffraction zones. The zone plate is positioned between the object which is to be imaged and a focal surface which may be a photographic film for example. The zone plate is centered on an optical axis extending from the object to the center of the focal surface and is at right angles to that axis which arrangement is termed a normal incidence configuration. Diffraction effects cause a focused image of a minute central region of the object to be present at the film or other recording medium. Various degrees of magnification can be obtained by adjustment of the spacings of components of the system.

The precise and minute groove spacings needed to obtain high resolution make zone plates exceedingly difficult to manufacture. Dimensional limitations of current state of the art groove forming apparatus, such as electron writing beams, holographic apparatus and ruling engines impose an undesirably low limit on the resolution which is obtainable with zone plates.

Conventional alternatives to the zone plate have heretofore been limited to plural element mirror systems. These are variously complex or subject to severe limits on surface roughness and alignment of elements, or produce a grazing focal surface or are otherwise subject to limitations and difficulties. The best spatial resolution yet obtained by any of these systems has been about one micron.

Reflection diffraction gratings differ from the zone plates described above and have not heretofore been capable of producing a desirably distortion free image although such gratings have been used for other purposes such as spectroscopic analysis. The reflection grating is a metallic plate having a series of minute transverse grooves distributed along one surface. X-rays which arrive at a high angle of incidence, termed a grazing angle, are reflected by the metallic surface and diffraction resulting from the presence of the grooves divides the reflected x-rays into distinct spectral orders, each of which leaves the grooved surface at a different exit angle. The diffracted x-rays of any given spectral order from successive grooves are convergent if the grating surface is concave as in the classical Rowland circle spectrometer.

Such reflection gratings have several characteristics which would be advantageous in x-ray imaging. They can be fabricated with large apertures enabling use at grazing incidence angles. This provides for high reflection efficiency and also enables the groove density or number of grooves per unit length of the grating to be substantially reduced in comparison with zone plates or other gratings which are disposed at right angles to the optical axis of the system. This also results in a spreading of high intensity radiation and its associated heat load over a large area.

The grooves of most prior reflection gratings have been evenly spaced along the grating surface. Use of such a grating for imaging in microscopy or telescopy, for example, has not been satisfactory because of the presence of severe optical aberrations in the image. Pronounced astigmatism, coma and spherical aberration are present. Satisfactory imaging also requires that magnification be at least substantially uniform across the optical aperture and this requirement is strongly violated by prior reflection gratings. Divergent rays emanating from a point-like object strike the grating at different angles and arrive at the focal surface of such gratings at different magnifications.

An aplanatic optical system is one in which all rays entering the optical aperture are uniformly magnified independently of the angle of the incoming ray or displacement from the optical axis. Satisfactory use of grazing incidence reflection gratings for many x-ray imaging applications requires a new configuration in which this condition is at least substantially met.

Gratings having groove spacings which progressively vary along the grating have recently been developed for the purposes of aberration correction thus enabling, for example, production of erect spectra and reduction of astigmatism. These prior gratings with varying groove spacing are not aplanatic and have been designed for use in spectroscopy rather than for x-ray microscopy or telescopy. Such prior gratings at best provide spatial resolution limited to about 10 microns.

The present invention is directed to overcoming one or more of the problems discussed above.

SUMMARY OF THE INVENTION

It is an object of this invention to reduce optical aberration in an image produced by a reflection diffraction grating which operates at grazing incidence.

It is another object of the invention to provide an aplanatic reflection diffraction grating for focussing x-rays or longer wavelength electromagnetic radiation into an image at a focal surface that is substantially planar and which is erect or normal to the optical axis of the system, wherein different regions of the optical aperture exhibit substantially the same magnification.

It is an object of the invention to increase the obtainable spatial resolution in x-ray imaging.

It is still another object of the invention to provide substantially distortion free images with reflection diffraction gratings without necessarily using a plurality of gratings or requiring groove curvatures that do not extend along the intersection of a plane and the grating surface.

In one aspect, the invention provides a grazing incidence diffraction grating for focusing intercepted rays from a first region into an image at a normal incidence focal surface at another region. The grating has a concave surface formed of reflective material and has a plurality of transverse grooves in the concave surface which define a series of diffraction zones. The spacing of corresponding points in successive ones of the grooves progressively varies along at least a portion of the concave surface. The change of spacing at successive grooves establishes substantially similar magnification along all ray paths from the grating to the focal surface.

The invention may be used in x-ray microscopy and is particularly suited for imaging minute objects at spatial resolutions of less than one micron. The invention is also applicable to x-ray telescopy and for other purposes such as microlithography, collimation and microprobing of substances with x-rays or other wavelengths.

Other objects and advantages of the invention will become apparent to those skilled in the art from the following description and the accompanying drawings.

BRIEF DESCRIPTION OF THE DRAWINGS

FIG. 1 is a perspective view of a substantially aplanatic diffraction grating in accordance with one embodiment of the invention.

FIG. 2 is a section view of a portion of the grating of FIG. 1 taken along line II—II thereof.

FIG. 3 depicts a typical usage of the grating of the preceding figures for x-ray imaging of a minute region of an object to produce one dimensional or line imaging.

FIG. 4 is a diagrammatic illustration of usage of two orthogonal diffraction gratings to produce two dimensional or stigmatic imaging.

FIG. 5 is a diagrammatic view of an embodiment of the invention wherein a single aplanatic diffraction grating produces a two dimensional x-ray image.

FIG. 6 is a top view of the embodiment of FIG. 5 taken along line VI—VI thereof.

FIG. 7 is a diagrammatic profile view of a theoretically ideal surface curvature for an aplanatic diffraction grating.

FIG. 8 is a diagrammatic illustration of the relative positions of the object, focal surface and grating in an embodiment of the invention for obtaining unit magnification in the image.

FIG. 9 is a figure corresponding generally to FIG. 8 but illustrating changed positions for obtaining infinite magnification or demagnification.

FIG. 10 is a diagram corresponding generally to FIGS. 8 and 9 but depicting representative locations for the object, grating and focal surface for realizing finite magnifications greater than one or less than one.

DETAILED DESCRIPTION OF THE INVENTION

Referring jointly to FIGS. 1 and 2 of the drawings, a diffraction grating 11 embodying the invention may have a base 12 to which a thin layer 13 of x-ray reflective material is adhered by vacuum deposition or other means. Base 12 provides structural support for the thin layer 13 and may be glass, for example, preferably of the type which is not subject to significant thermal expansion and contraction. The surface 14 of base 12 which contacts layer 13 is an optically polished one. Layer 13 may be gold, or other metal which efficiently reflects x-rays that arrive at a large, grazing, angle of incidence.

To provide for imaging of intercepted x-rays, the base surface 14 and thus the metal layer 13 have a spherical configuration in this embodiment and a large number of minute transverse grooves 16 are formed in the surface of layer 13 to establish a series of diffraction zones along the grating 11. The series of grooves 16, viewed in profile as in FIG. 2, has a saw tooth configuration and thus each groove has a small facet 17 which is steeply inclined relative to base surface 14 and a large facet 18 with a much smaller inclination. Facets 17 and 18 are usually oriented at right angles to each other.

The base 12 is typically from several millimeters to 2 centimeters thick although this dimension is not critical. Metal layer 13 is typically two to three times thicker than the maximum groove 16 depth. The number of grooves 16 that are present per unit length of the grating 11, termed the groove density, varies at different regions for reasons which will hereinafter be discussed but may for example be of the order of 2000 per millimeter at some locations. The width of the grooves 16 is similarly variable but may be of the general order of 5000 Angstrom units.

It should be recognized that FIGS. 1 and 2 and certain of the following figures are necessarily diagrammatic in nature as it is not possible to depict the extremely minute grooves 16 and high groove densities in the scale of the drawings. Thus there are actually far more grooves 16 than are shown in FIG. 1. Similarly, the inclinations of facets 17 and 18 and thus the depths of the grooves are necessarily exaggerated in FIG. 2 relative to a typical grating embodying the invention. The inclination of the large facets 18 relative to surface 14, termed the blaze angle ($\delta$), is in many cases as small as about one degree although that value should not be considered to be limiting. The curvature of surface 14 and layer 13 is not discernable in FIG. 2 as it is depictive of a very minute region of the grating 11.

Referring to FIG. 2 in particular, the grating 11 is oriented during use to intercept the x-rays at a high angle of incidence, the angle of incidence of a particular incoming x-ray path 19 being the angle of the path relative to a line that is normal to surface 14 and which extends through the point of impact of the x-ray path on one of the large facets 18 of a groove. Reflection efficiency of the grating 11 increases as a function of angle of incidence. Thus very high angles of incidence, such as 87 degrees for example, may be used in some cases. The numerical aperture of the grating 11, i.e. the proportion of x-rays diverging from a point object that the grating can intercept, is an inverse function of the angle of incidence. Thus imaging of relative large aperture x-ray beams may require smaller incidence angles and acceptance of less reflection efficiency.

Arriving x-rays strike the large facet 18 of one of the grooves 16. A portion of the x-rays arriving along a given path 19 undergo zero order or mirror reflection and are redirected away along an exit path 21. The angle of reflection of such x-rays from the grating 11 is equal to the angle of incidence of such x-rays in accordance with well known mirror behavior. The mirror reflected x-rays constitute what is termed the zero spectral order. If the focal surface at which an image is to be formed is situated at the zero spectral order region where the mirror reflected x-rays from different areas of the grating 11 converge, the resulting image exhibits the previously discussed severe optical aberrations.

Other x-rays arriving along the same x-ray path 19 undergo diffraction and are consequently detectable at a series of discrete ray paths, some of which are indicated by dashed lines 22, 23 and 24 in FIG. 2, that leave the grating 11 at a series of different angles relative to the path 21 of the mirror reflected x-rays. The diffracted ray paths 22 and 23 which form the smallest angle with reflection path 21 constitute the minus and plus first spectral orders and are generally more intense than others, such as the second spectral order 24 which form a greater angle with the reflection path 21.

For highest efficiency, the facet 18 is oriented to make the angle at which the incident ray path 19 strikes the surface of the facet equal to the angle at which a selected one 22 of the diffracted ray paths leaves the facet surface. The selected diffracted ray path 22 is that of the spectral order which is to be used to form the image and usually the relatively intense first spectral order is used for the purpose although this may not always necessarily be the case. This orientation of the facet 18 determines the blaze angle ($\delta$).

The reflected x-ray paths 21 and different spectral order paths 22, 23, 24 from the plurality of grooves 16 are each convergent at separate locations in space. Thus, with reference to FIG. 3, the selected particular spectral order may be used to define the desired image by locating the image detector such as a photographic film 26 at the region where the rays 22a, 22b, 22c of that particular order are convergent.

FIG. 3 is illustrative of the imaging of a minute object 27 at the plane focal surface defined by film 26. The object 27 is positioned at the focal point of x-rays emitted from a focused x-ray source 28 which may be of known construction. A particular grating 11 operates at a specific x-ray wavelength or narrow band of wavelengths. Thus the x-ray source 28 should be of the monochromatic type which emits only a single wavelength or one which emits a very narrow band of wavelengths.

Grating 11 is positioned to intercept the divergent cone of x-rays which have passed through object 27 and is angled to establish the desired angle of incidence with the principal or central ray 29. Detector 26 is positioned at the opposite side of the grating 11 from source 28 at the region of convergence of the first spectral order rays 22a, 22b, 22c from successive areas of the grating. The focal surface defined by film 26 in this example is oriented at right angles to the principal or central ray 22b and thus is in a normal incidence configuration.

Film 26 may be substantially enclosed by thick x-ray absorptive shielding 31 to avoid image degradation by scattered x-rays. A thin filter 32 of material which is x-ray transmissive but opaque to other wavelengths may extend across the x-ray entrance aperture 33 of shielding 31 to further protect the film 26 against unwanted exposure.

While the detector in this example is a film 26 which exhibits the desired image after development, electronic detectors of known form may also be utilized.

Referring again to FIG. 2, a grating 11 having a uniform groove spacing (d) is not aplanatic and will not produce an acceptable image on an erect focal surface if used in an imaging system of the kind described above. An aplanatic grating 11 in accordance with the present invention has a groove spacing and thus a groove density which progressively varies in accordance with a mathematical expression which will hereinafter be set forth.

The term groove spacing is used herein, in accordance with the common practice in the art, to designate the distance d between corresponding points in adjacent grooves 16. Efficiency is highest if the grooves 16 are adjoining rather than being spaced apart although this may no be strictly realizable in practice. Thus a variation in groove spacing as the term is used in the art also means a variation in the width of successive grooves 16. If the blaze angle at successive grooves 16 is constant, this is accompanied by a progressive variation in the depth of the grooves 16.

Referring now to FIG. 8, aplanatism or nearly uniform magnification along all ray paths 34 in a diffraction grating 11 system requires that all ray paths 34 satisfy equation (1) below:

$$M = (r'/r)(\cos \alpha / \cos \beta)(\cos \theta / \cos \theta') \quad (1)$$

where: M is the magnification, r is the object distance, r' is the image distance, $\alpha$ is the angle of incidence, $\beta$ is the angle of diffraction, $\theta$ is the angle between the ray path and a normal to the object plane and $\theta'$ is the angle between the ray path and a normal to the image plane.

Referring again to FIG. 2, I have ascertained that a grating 11 substantially satisfies equation (1) if the grating surface is of a constant curvature of radius R, the following mathematical expression (2) is satisfied and the groove spacing d at successive grooves 16 is in accordance with the following mathematical expression (3):

$$\sin \alpha_o / r_o + \sin \beta h d \, o/r'_o = \tfrac{1}{2}(\tan \alpha_o + \tan \beta_o)/R \quad (2)$$

or equivalently:

$$r_o = 2R \cos \alpha_o (\tan \alpha_o + \tan \beta_o / M)(\tan \alpha_o + \tan \beta_o)$$

and $$r'_o = M r_o \cos \beta_o / \cos \alpha_o$$

The subscript o in the above expression denotes that the quantity is defined at the point where the principal ray strikes the grating 11.

The groove spacing d then varies according to:

$$a(\phi) = m\lambda^* / [\sin \beta(\phi) - \sin \alpha(\phi)] \quad (3)$$

where: $a(\phi)$ is the groove spacing at an angle $\phi$ relative to the center of curvature of the grating, where m is the spectral order, where $\lambda_4$ is the wavelength at which the grating honors expression (2), where $\alpha(\phi)$ and $\beta(\phi)$ are in general the local angles of incidence and diffraction.

FIG. 8 depicts the location of the object 27a and focal surface 26a where the grating 11a is configured in accordance with expressions (1) and (2) for unit magnification (M=1) and where in expression (3) $\alpha(\phi) = \alpha_o - \phi/2$ and $\beta(\phi) = \alpha_o + \phi/2$. Both the object 27a and the center of the focal surface 26a are on a circle 36 having the same radius and center of curvature as the grating 11 surface and which is coplanar with the principle or central ray path 34a. Aplanatic imaging is still obtained if the object 27a and focal surface center 26a are jointly traveled to other positions along circle 36 although the orientation of the focal surface 26a then changes in order to continue to be normal to the principal ray 34a. The resolving power or monchromaticity of the x-ray source must be:

$$\lambda/\Delta\lambda = \lambda^* R \cos \alpha_o / (2\Delta X^2)$$

where $\Delta X$ is the diffraction limited image width for a fully illuminated grating width.

Referring now to FIG. 9, a grating 11b which is configured in accordance with expression (2) to provide infinite magnification results in an object 27b location situated at a selected point on a circle 37 that has a diameter equal to the radius of grating 11b curvature. and which is tangent to the grating surface. The focal surface (not shown) is located an infinite distance away and thus the exiting ray paths 34b are parallel. The groove spacing is given by expression (3) with:

$$\alpha(\phi) = \arctan\{\sin\alpha_o \cos(\phi - \alpha_o)/[1 + \sin\alpha_o \sin(\phi - \alpha_o)]\}$$

and $$\beta(\phi) = \alpha_o + \phi.$$

The grating 11b of FIG. 9 may be utilized as a collimator as it effectively parallelizes x-rays which are initially divergent from a source. As in most other optical systems, ray paths are reversible. Thus the grating 11b is also operable as a telescope as incoming parallel ray paths can be made convergent at a focal surface situated at the location of the object 27b.

FIG. 10 is representative of the object 27c, grating 11c and focal surface 26c geometry in instances where the variable groove spacing is determined in accordance with expressions (1), (2) and (3) to provide a finite degree of magnification or demagnification other than unity. The object 27c position is then between the circles 36 and 37 while the focal surface 26c is outward from circle 36.

The unit magnification system previously described with respect to FIG. 8 is aplanatic. As depicted in FIG. 7, an aplanatic grating 11f for providing non-unit magnification or demagnification would have a non-spherical curvature or profile. The grating 11f curvature, which in this example is configured for a magnification of three, becomes progressively smaller in the direction of the object 27f. As in the aplanatic grating 11a of FIG. 8, both the object 27f and the center of the focal surface 26f lie on an extension of the curved surface of the grating which condition appears to be a general requirement for an aplanatic grating system. It may be noted that this condition is not met in the non-unit magnification embodiment of FIG. 10 which is of a form that I have termed quasi-aplanatic.

Manufacture of a non-spherical grating 11f of the type depicted in FIG. 7 with desired precision is exceedingly difficult at best, if possible at all, given the present state of the optical surface fabrication art. Existing equipment is designed at least primarily to form highly accurate plane or spherical surfaces. The previously given expressions (1) to (3) define a spherical grating configuration which substantially duplicates the behavior of the theoretical non-unit magnification grating of FIG. 7. The unit magnification system of FIG. 8 represent a special case where these expressions reduce to define an actua aplanatic grating 11a.

With an exception to be hereinafter described, imaging systems which include only a single grating 11 such as those of FIGS. 3 and 8 to 10 are effectively one dimensional. In some applications this can provide sufficient information about the observed object. Also, it is possible to construct a two dimensional image by combining a series of one dimensional or line images of successive parallel zones of an object. Computer assisted techniques are known for constructing two dimensional images from crossed one dimensional images.

It is, of course, preferable in many instances to produce a two dimensional image without the additional steps and complications discussed above. This can be done, as shown in FIG. 4, by providing two orthogonally oriented gratings 11d and 11e to define the optical path 38 from the object 27d to the focal surface 26d. The upstream grating 11d provides a virtual line focus in the sagittal direction of the downstream grating and vice versa. Gratings 11d and 11e may have a construction similar to that hereinbefore described with reference to FIG. 1 and are arranged with grating 11d having increasing groove density in the direction of object 27d while grating 11e is oppositely oriented with increasing groove density in the direction of focal plane 26d.

The arrangement of FIG. 4 provides equal magnification in the image in two orthogonal directions if the gratings 11d, 11e have variable groove spacings for obtaining unit magnification as previously described. Magnification in the two directions becomes progressively more unequal with gratings 11d, 11e that are configured for increasingly greater degrees of magnification and some optical aberration, notably sagittal coma, is present which effects need to be adjusted for during analysis of the image.

Sagittal coma can be substantially eliminated from the optical system of FIG. 4 if the gratings 11d, 11e are formed with cylindrical surfaces instead of spherical surfaces but the limitations of state of the art optical surface fabrication and testing techniques make it difficult to obtain cylindrical surfaces with the precision that is necessary.

FIGS. 5 and 6 illustrate the specific optical system which is capable of focusing a two dimensional image of an object 27g at a normal incidence focal surface 26g with a single aplanatic grating 11g. The grating 11g has the previously described groove spacing variation that provides for unit magnification although in this instance the widest groove 16g is situated at the center of the grating and groove spacing becomes progressively smaller, in accordance with expression (3), in each outward direction from the center.

The object 27g and the center of the focal surface 26g are both located on the circle 36 at positions where the angle of incidence of the principal ray path 19g at the center of the grating 11g and the angle of diffraction of the principal ray path 34g from that point are both 45 degrees. This substantially eliminates both astigmatism and sagittal coma in addition to realizing aplanatism in two directions. The system of FIGS. 5 and 6 is particularly suited for use as a simple submicron refocusing element although the relatively low incidence angle does not provide for x-ray grazing incidence reflectivity and thus the system operates efficiently with classical coating layers 13g only with wavelengths longer than about 200 Angstrom units. The more recently developed multilayered coatings may be used as layer 13g to provide efficient reflection at shorter wave lengths.

The form of aplanatic diffraction grating 11g shown in FIG. 6 has the widest groove 16g at the center and groove spacings become progressively smaller in each outward direction in accordance with expression (2) and (3). In practice, a limited aperture near the center of such a grating 11g may be eliminated without compromising the hereinbefore described imaging properties. The grating 11 of FIG. 1, for example, may be seen to be similar to somewhat less than one half of the centered grating 11g of FIG. 6 although the rates of variation of groove spacings may not necessarily be the same in the two cases. Similarly, the orthogonally oriented gratings 11d and 11e of FIG. 4 may be essentially similar to opposite side portions of the centered grating 11g of FIG. 6.

The invention has been described primarily with respect to x-ray optics. It should be recognized that diffraction gratings embodying the invention are also capable of imaging longer wavelength portions of the electromagnetic spectrum including visible light although visible light differs from x-rays in that imaging can also be accomplished with conventional glass lenses or the like.

While the invention has been described with respect to certain specific embodiments for purposes of example, many other variations and modifications are possible within the scope of the invention and it is not intended to limit the invention except as defined in the following claims.

What is claimed is:

1. A grazing incidence diffraction grating for focusing intercepted x-rays from a first region into an image at a substantially normal incidence focal surface located at another region, said grating having a concave surface formed of reflective material and having a plurality of transverse grooves in said concave surface which define a series of diffraction zones along said concave surface, wherein the spacing of corresponding points in successive ones of said grooves progressively varies along at least a portion of said concave surface and wherein the change of spacing at successive grooves establishes substantially similar magnification along all ray paths from said grating to said focal surface.

2. The diffraction grating of claim 1 wherein said concave surface is spherical.

3. The diffraction grating of claim 1 wherein said concave surface is configured to redirect divergent ray paths originating at a point in said first region into diffracted ray paths of a predetermined spectral order that converge at said focal surface and wherein said grooves have a spacing in accordance with the expression:

$$a(\phi) = m\lambda^*/[\sin \beta(\phi) - \sin \alpha(\phi)]ps$$

where: $a(\phi)$ is the groove spacing at a location situated at an angle $\phi$ relative to the center of curvature of said concave surface, m is said predetermined spectral order, $\lambda^*$ is a predetermined wavelength with which said grating is to be operated, $\alpha(\phi)$ is the angle of incidence of the intercepted ray path at said location and $\beta(\phi)$ is the angle of diffraction of the diffracted ray path which originates at said location.

4. The diffraction grating of claim 3 having a configuration which also satisfies the expression:

$$\sin \alpha_o/r_o + \sin \beta_o/r_o' = \tfrac{1}{2}(\tan \alpha_o + \tan \beta_o)/R$$

resulting in:

$$r_o = 2R \cos \alpha_o(\tan \alpha_o + \tan \beta_o/M)/(\tan \alpha_o + \tan \beta_o)$$

and:

$$r_o' = Mr_o \cos \beta_o/\cos \alpha_o$$

wherein the subscript o denotes that the quantity is defined at the point where the principal ray path strikes said grating and wherein R is the radius of curvature of said concave surface r is the object distance, r' is the image distance, and M is a predetermined magnification factor.

5. The diffraction grating of claim 4 wherein said magnification factor M is equal to one and said grating has a configuration locating the center of said focal surface and the origin point of said ray paths at a circle which has a center of curvature coincident with the center of curvature of said concave surface.

6. The diffraction grating of claim 4 wherein said magnification factor M is substantially infinite and wherein said grating has a configuration locating the origin point of said ray paths at a circle having a diameter equal to the radius of curvature of said concave surface and which is tangent to said concave surface at the point where the principal ray path strikes said grating.

7. The diffraction grating of claim 4 wherein said magnification factor M is a finite number other than one and wherein said grating has a configuration locating said focal surface at a region outside of a circle which has a center of curvature coincident with the center of curvature of said concave surface and locating the origin point of said ray paths between said circle and another circle having a diameter equal to the radius of curvature of said concave surface and which is tangent to said concave surface at the point where the principal ray path strikes said grating.

8. The diffraction grating of claim 4 wherein said magnification factor M is equal to one and said grating has a configuration locating the center of said focal surface and the origin point of said ray paths at a circle which has a center of curvature coincident with the center of curvature of said concave surface, said origin point being at a location on said circle where the principal ray path strikes said grating at a 45 degree angle of incidence and said focal surface center being at a point on said circle where the principal diffracted ray path leaves said grating at a 45 degree angle whereby said grating is aplanatic and produces a two dimensional image at said focal surface.

9. The diffraction grating of claim 8 wherein the largest groove spacing is at the region where said principal ray strikes said grating and wherein said groove spacing decreases outwardly from said region in each of two opposite directions.

10. In an optical system for producing a two dimensional image of an object at a spaced apart focal surface, the combination comprising first and second reflection diffraction gratings disposed between said object and focal surface, said first diffraction grating having a first concave surface formed of reflective material which is positioned to intercept rays from said object at grazing incidence and to direct convergent diffracted rays towards said second diffraction grating, said second diffraction grating having a second concave surface formed of reflective material and which is positioned to receive said diffracted rays from said first diffraction grating at grazing incidence and to direct convergent re-diffracted rays to said focal surface at normal incidence, said first and second concave surfaces being oriented in orthogonal relationship, and wherein each of said concave surfaces has a plurality of grooves formed therein which grooves are transverse to the path of intecepted rays and which form a series of diffraction zones on said gratings, said grooves at each of said concave surfaces having a progressively varying spacing therealong which establishes a substantially uniform magnification across the optical aperture of said system.

* * * * *